(12) United States Patent
Yue (10) Patent No.: US 9,113,034 B2
(45) Date of Patent: Aug. 18, 2015

(54) METHOD AND APPARATUS FOR PROCESSING AUDIO IN VIDEO COMMUNICATION

(71) Applicant: Huawei Device Co., Ltd., Shenzhen, Guangdong (CN)

(72) Inventor: Zhonghui Yue, Shenzhen (CN)

(73) Assignee: Huawei Device Co., Ltd., Shenzhen (CN)

(*) Notice: Subject to any disclaimer, the term of this patent is extended or adjusted under 35 U.S.C. 154(b) by 217 days.

(21) Appl. No.: 13/693,823

(22) Filed: Dec. 4, 2012

(65) Prior Publication Data
US 2013/0093837 A1    Apr. 18, 2013

Related U.S. Application Data

(63) Continuation of application No. PCT/CN2011/082127, filed on Nov. 14, 2011.

(30) Foreign Application Priority Data

Nov. 26, 2010    (CN) .......................... 2010 1 0561696

(51) Int. Cl.
*H04N 7/14*    (2006.01)
*H04N 7/15*    (2006.01)
(Continued)

(52) U.S. Cl.
CPC ................ *H04N 7/15* (2013.01); *H04M 3/568* (2013.01); *H04N 5/60* (2013.01); *H04N 7/152* (2013.01);
(Continued)

(58) Field of Classification Search
USPC .............. 348/54, 14.01–14.16; 370/259–271, 370/351–357; 379/201.01, 202.01; 704/270–278; 709/201–207, 217–248
See application file for complete search history.

(56) References Cited

U.S. PATENT DOCUMENTS

| 7,327,848 B2 * | 2/2008 | Squibbs ........................... 381/56 |
| 8,208,664 B2 * | 6/2012 | Iwasaki .......................... 381/310 |

(Continued)

FOREIGN PATENT DOCUMENTS

| CN | 1717955 A | 1/2006 |
| CN | 1929593 A | 3/2007 |

(Continued)

OTHER PUBLICATIONS

International Search Report in corresponding International Patent Application No. PCT/CN2011/082127 (Feb. 23, 2012).

(Continued)

*Primary Examiner* — Hemant Patel
(74) *Attorney, Agent, or Firm* — Leydig, Voit & Mayer, Ltd.

(57) ABSTRACT

Embodiments of the present invention provide a method and an apparatus for processing audio in video communication. The method includes: acquiring audio data and audio source position information corresponding to the audio data in the video communication, and performing longitudinal-depth processing on the audio data according to the audio source position information. According to the embodiments of the present invention, the audio data and the audio source position information corresponding to the audio data in the video communication are acquired first, and then the longitudinal-depth processing is performed on the audio data according to the acquired audio source position information to make it be audio data that provides a longitudinal-depth feeling that matches the audio source position information, so that sounds generated by objects at different front/back positions can be distinguished in the video communication.

20 Claims, 3 Drawing Sheets

(51) Int. Cl.
*H04N 5/60* (2006.01)
*H04S 7/00* (2006.01)
*H04M 3/56* (2006.01)
*H04R 27/00* (2006.01)
*H04N 21/422* (2011.01)
*H04N 21/4788* (2011.01)
*H04N 21/647* (2011.01)
*H04N 21/81* (2011.01)

(52) U.S. Cl.
CPC ..... *H04N 21/42203* (2013.01); *H04N 21/4788* (2013.01); *H04N 21/64784* (2013.01); *H04N 21/8106* (2013.01); *H04R 27/00* (2013.01); *H04S 7/30* (2013.01); *H04S 2400/11* (2013.01); *H04S 2400/13* (2013.01); *H04S 2400/15* (2013.01)

(56) References Cited

U.S. PATENT DOCUMENTS

| | | | |
|---|---|---|---|
| 8,315,366 B2 * | 11/2012 | Basart et al. | 379/142.01 |
| 2003/0053680 A1 | 3/2003 | Lin et al. | |
| 2006/0013416 A1 * | 1/2006 | Truong et al. | 381/119 |
| 2010/0328419 A1 * | 12/2010 | Etter | 348/14.08 |
| 2011/0310235 A1 * | 12/2011 | Sasaki et al. | 348/54 |

FOREIGN PATENT DOCUMENTS

| | | |
|---|---|---|
| CN | 101350931 A | 1/2009 |
| EP | 1906707 A1 | 4/2008 |
| EP | 1962547 A1 | 8/2008 |
| EP | 2323425 A1 | 5/2011 |
| JP | H09261351 A | 10/1997 |
| WO | WO 2004051624 A2 | 6/2004 |
| WO | WO 2010022633 A1 | 3/2010 |

OTHER PUBLICATIONS

Extended European Search Report in corresponding European Patent Application No. 11843560.1 (Jul. 18, 2013).
Written Opinion of the International Searching Authority in corresponding PCT Patent Application No. PCT/CN2011/082127 (Feb. 23, 2012).
1st Office Action in corresponding Chinese Patent Application No. 201010561696.7 (Jun. 9, 2013).
"Sound localization," Wikipedia, the free encyclopedia, <http://en.wikipedia.org/w/index.php?title=Sound_localization&oldid=395719358> (as edited Nov. 9, 2010).

* cited by examiner

METHOD AND APPARATUS FOR PROCESSING AUDIO IN VIDEO COMMUNICATION

CROSS-REFERENCE TO RELATED APPLICATIONS

This application is a continuation of International Patent Application No. PCT/CN2011/082127, filed on Nov. 14, 2011, which claims priority to Chinese Patent Application No. 201010561696.7, filed on Nov. 26, 2010, both of which are hereby incorporated by reference in their entireties.

FIELD OF TECHNOLOGY

Embodiments of the present invention relate to the field of communications technologies, and in particular to a method and an apparatus for processing audio in video communication.

BACKGROUND

A videoconferencing service is a kind of multimedia communications means, which uses a television and a communications network to hold a conference, and may implement image, voice, and data interaction functions between two places or among multiple places. Generally, the videoconferencing system includes several parts such as a video terminal equipment, a transmission network, and a multipoint control unit (Multipoint Control Unit, MCU for short). The video terminal equipment mainly includes a video input/output device, an audio input/output device, a video codec, an audio codec, an information communications device, and a multiplexing/signal distribution device. Basic functions of the video terminal equipment are to compress and encode image signals shot by a local camera and audio signals picked up by a microphone, then transmit the signals to a transmission network to transmit the signals to a remote conference site, and simultaneously receive digital signals transmitted from the remote conference site, and restore the digital signals to analog image and audio signals by performing decoding.

The videoconferencing service achieves long-distance audio and video communication. With continuous development and progress in technologies, a telepresence system appears, which can enable remote communication to achieve a face-to-face communication effect. The current telepresence system uses videoconferencing technologies to implement remote transmission of images and sounds, combines a whole peripheral, for example, uses a large-sized LCD television to achieve "true-to-life dimensions", uses certain camera-based processing technologies to achieve people's "eye to eye" communication, and combines a complete decoration solution for a conference room to achieve a highly realistic effect of remote presentation.

The current telepresence system is capable of achieving a comparatively realistic effect. However, regarding newly emerged double-row or multi-row telepresence, there is a certain distance between a front row and a back row. The current telepresence system is capable of only achieving a mapping between an image direction and a sound direction on a same plane. That is, sounds from both the front row and the back row are generated from the same plane. If no image is seen, whether a sound is from the front row or the back row cannot be distinguished. Therefore, the on-site feeling effect of the sound is not realistic.

SUMMARY

Embodiments of the present invention provide a method and an apparatus for processing audio in video communication to distinguish sounds from different rows in multi-row video communication.

An embodiment of the present invention provides a method for processing audio in video communication, including:

acquiring audio data and audio source position information corresponding to the audio data in the video communication; and performing longitudinal-depth processing on the audio data according to the audio source position information.

An embodiment of the present invention further provides a method for processing audio in video communication, including:

acquiring audio data and audio source position information corresponding to the audio data on a local end in the video communication; and sending the audio data and the audio source position information to a video communication control unit or a peer end in the video communication, so that the video communication control unit or the peer end in the video communication performs longitudinal-depth processing on the audio data according to the audio source position information.

An embodiment of the present invention provides an apparatus for processing audio in video communication, including:

a first acquiring module, configured to acquire audio data and audio source position information corresponding to the audio data in the video communication; and a processing module, configured to perform longitudinal-depth processing on the audio data according to the audio source position information acquired by the first acquiring module.

An embodiment of the present invention further provides an apparatus for processing audio in video communication, including:

a second acquiring module, configured to acquire audio data and audio source position information corresponding to the audio data on a local end in the video communication; and a second sending module, configured to send the audio data and the audio source position information that are acquired by the second acquiring module to a video communication control unit or a peer end in the video communication, so that the video communication control unit or the peer end in the video communication performs longitudinal-depth processing on the audio data according to the audio source position information.

According to the method and the apparatus for processing audio in the video communication in the embodiments of the present invention, the audio data and the audio source position information corresponding to the audio data in the video communication are acquired first, and then the longitudinal-depth processing on the audio data is performed according to the acquired audio source position information to make it be audio data that provides a longitudinal-depth feeling that matches the audio source position information, so that sounds generated by objects at different front/back positions can be distinguished in the video communication.

BRIEF DESCRIPTION OF THE DRAWINGS

To illustrate the technical solutions in the embodiments of the present invention more clearly, the following briefly describes the accompanying drawings required for describing the embodiments. Apparently, the accompanying drawings in the following description show some embodiments of the present invention, and a person skilled in the art can derive other drawings from these accompanying drawings without creative efforts.

DETAILED DESCRIPTION

To make the objectives, technical solutions, and advantages of the present invention more comprehensible, the following clearly and completely describes the technical solutions according to the embodiments of the present invention with reference to the accompanying drawings in the embodiments of the present invention. Apparently, the embodiments in the following description are a part rather than all of the embodiments of the present invention. All other embodiments obtained by a person skilled in the art based on the embodiments of the present invention without creative efforts shall fall within the protection scope of the present invention.

Figure 1:
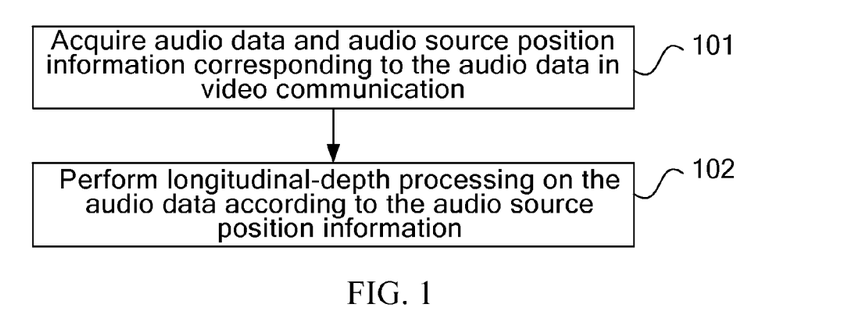
FIG. 1 is a flowchart of a first embodiment of a method for processing audio in video communication according to the present invention.

FIG. 1 is a flowchart of a first embodiment of a method for processing audio in video communication according to the present invention. As shown in FIG. 1, the method includes:

Step 101: Acquire audio data and audio source position information corresponding to the audio data in the video communication.

Each embodiment of the method may apply to video communication, for example, a double-row or multi-row video conference or a 3D video conference, in which multiple audio sources exist at different front/back positions. The following takes a scenario of a multi-row video conference as an example for description, and the video conference may include a two-end session or a multi-end session. For other scenarios, reference may be made to the description about this scenario.

An apparatus for processing audio acquires the audio data of the current speaker and audio source position information corresponding to the audio data in the video communication. The audio source position information is information about a position of the object corresponding to the audio data relative to the first row in the video communication. That is to say, the audio source position information is information about a distance between the position of the current speaker and the first row in the video communication. When the speaker is in the first row, the audio source position information is 0.

In this embodiment, the audio data acquired by the apparatus for processing audio may be audio data on a local end. In this case, the apparatus for processing audio is a device on an audio data collection end. The audio data acquired by the apparatus for processing audio may be audio data on a peer end. In this case, the apparatus for processing audio is a device on an audio data playing end. In addition, the apparatus for processing audio may be a device on an MCU end in the video communication, which is configured to acquire audio data from the audio data collection end, process the audio data, and then send it to the audio data playing end.

When the audio data acquired by the apparatus for processing audio is the audio data on the local end, the apparatus for processing audio may acquire the current audio data and the audio source position information corresponding to the audio data on the local end through a sound pickup device (such as a microphone) on the local end.

When the audio data acquired by the apparatus for processing audio is the audio data on the peer end, the apparatus for processing audio acquires the audio data and the audio source position information on the peer end by receiving the audio data and the audio source position information sent by the peer end (the audio data collection end). The audio data and the audio source position information that are sent by the peer end are acquired by the apparatus for processing audio on the peer end through a sound pickup device.

When the apparatus for processing audio is the device on the MCU end, the apparatus for processing audio receives audio data and audio source position information on one end which are sent by the end in the video communication to acquire the audio data and the audio source position information on the end.

Step 102: Perform longitudinal-depth processing on the audio data according to the audio source position information.

A longitudinal-depth feeling is a sense of human ears about a distance and depth. The distance is a distance of a certain sound source sensed by human ears. The depth is used to describe a sensed distance from the front to the back in a whole sound scenario. The longitudinal-depth feeling is a feeling of distance hierarchy of a sound generated ahead. When the sound provides the longitudinal-depth feeling, human ears are capable of judging the distance of the sound source according to the sound. That is, a user is capable of distinguishing, according to the sound, the front/back position in which the speaker is located in the video communication.

After acquiring the audio data and the audio source position information, the apparatus for processing audio performs longitudinal-depth processing on the audio data according to the audio source position information, so that the audio data provides the longitudinal-depth feeling that corresponds to the audio source position information. In this way, the user may be capable of distinguishing, according to the sound, the front/back position on which the object corresponding to the audio data is located in the video.

After the apparatus for processing audio performs the longitudinal-depth processing on the audio data, if the apparatus for processing audio is located on the audio data collection end or the MCU end, the apparatus for processing audio sends the audio data that has undergone the longitudinal-depth processing to the playing end, so that the peer end plays the audio data; if the apparatus for processing audio is located on the audio data playing end, the apparatus for processing audio directly plays the audio data.

A method of performing the longitudinal-depth processing on the audio data may include: (1) using an algorithm for controlling the longitudinal-depth feeling to control parameters such as loudness of the sound, acoustic energy ratio between a direct sound and a reverberant sound, and high-frequency attenuation to implement the longitudinal-depth processing; and (2) using wave field synthesis (Wave Field Synthesis) technologies to process the sound, so that the processed sound provides the longitudinal-depth feeling.

It should be noted that when the algorithm for controlling the longitudinal-depth feeling is used to process the audio data, the processing may be performed on the audio data collection end, and may also be performed on the audio data playing end; when the wave field synthesis technologies are used to process the audio data, the processing is performed on the audio data playing end.

According to this embodiment of the present invention, the apparatus for processing audio first acquires audio data and the audio source position information corresponding to the audio data in the video communication, and then performs, according to the acquired audio source position information, the longitudinal-depth processing on the audio data to make it be audio data that provides the longitudinal-depth feeling that matches the audio source position information, so that sounds generated by objects at different front/back positions can be distinguished in the video communication.

Figure 2:
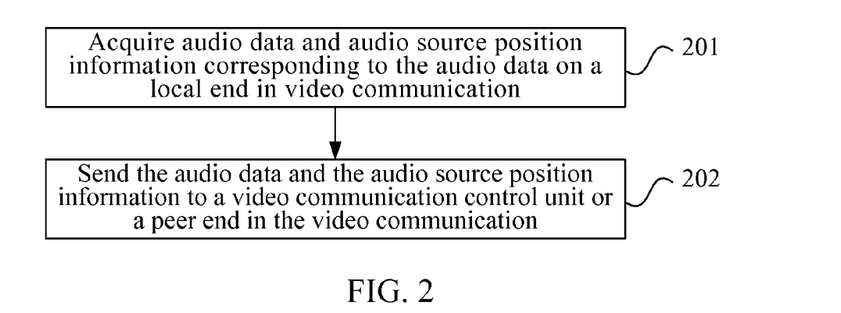
FIG. 2 is a flowchart of a second embodiment of a method for processing audio in video communication according to the present invention.

FIG. 2 is a flowchart of a second embodiment of a method for processing audio in video communication according to the present invention. As shown in FIG. 2, the method includes:

Step 201: Acquire audio data and audio source position information corresponding to the audio data on a local end in the video communication.

This embodiment of the present invention applies to a scenario in which an audio data playing end or an MCU end in the video communication performs longitudinal-depth processing on the audio data. The executor of this embodiment is an audio data collection end.

An apparatus for processing audio on the local end in the video communication acquires the current audio data on the local end through a sound pickup device and acquires the audio source position information corresponding to the audio data through an identifier of the sound pickup device. Different sound pickup devices correspond to participants at different front/back positions, so that audio source position information corresponding to audio data picked up by a sound pickup device may be acquired according to the difference of sound pickup devices.

Step 202: Send the audio data and the audio source position information to a video communication control unit or a peer end in the video communication, so that the video communication control unit or the peer end in the video communication performs longitudinal-depth processing on the audio data according to the audio source position information.

The apparatus for processing audio sends the acquired audio data and audio source position information on the local end to the video communication control unit, such as the MCU, and then the MCU performs the longitudinal-depth processing on the audio data according to the audio source position information; or the apparatus for processing audio sends the acquired audio data and audio source position information on the local end to the peer end in the video communication, and then the peer end performs the longitudinal-depth processing on the audio data according to the audio source position information.

According to this embodiment of the present invention, the apparatus for processing audio acquires the audio data on the local end in the video communication and the audio source position information corresponding to the audio data, and then sends out the acquired audio data and audio source position information, so that the MCU or the peer end in the video communication performs the longitudinal-depth processing on the audio data according to the audio source position information to obtain the audio data that provides a longitudinal-depth feeling that matches the audio source position information. In this way, a listener may be capable of distinguishing sounds generated by objects at different front/back positions in the video communication.

It should be learned from each of the foregoing embodiments of the present invention that, according to the solutions provided in each of the embodiments of the present invention, the longitudinal-depth processing may be performed on the audio data on the audio data collection end; the longitudinal-depth processing may be performed on the audio data on the MCU end; and the longitudinal-depth processing may also be performed on the audio data on the audio data playing end. The following describes in detail the embodiment of the present invention according to different positions at which the longitudinal-depth processing is performed on the audio data.

Figure 3:
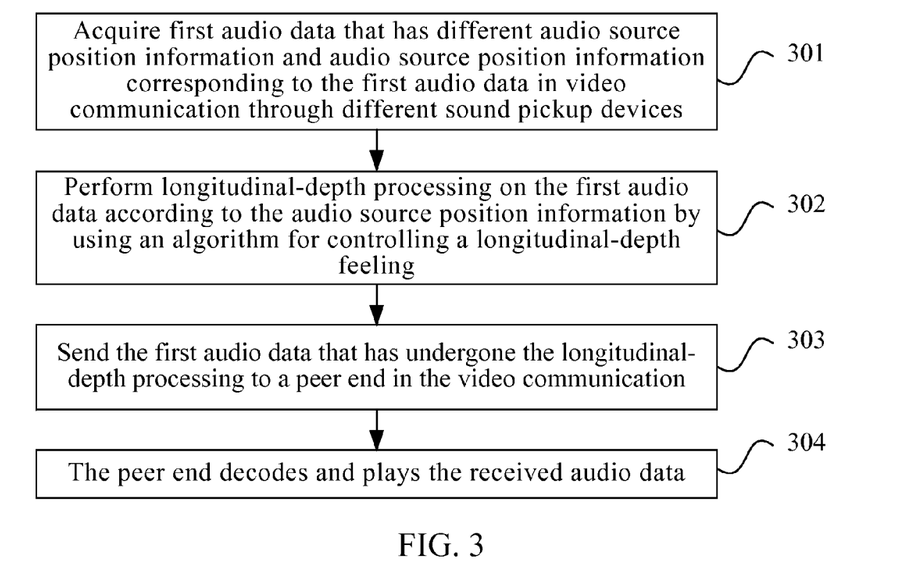
FIG. 3 is a flowchart of a third embodiment of a method for processing audio in video communication according to the present invention.
Figure 4:
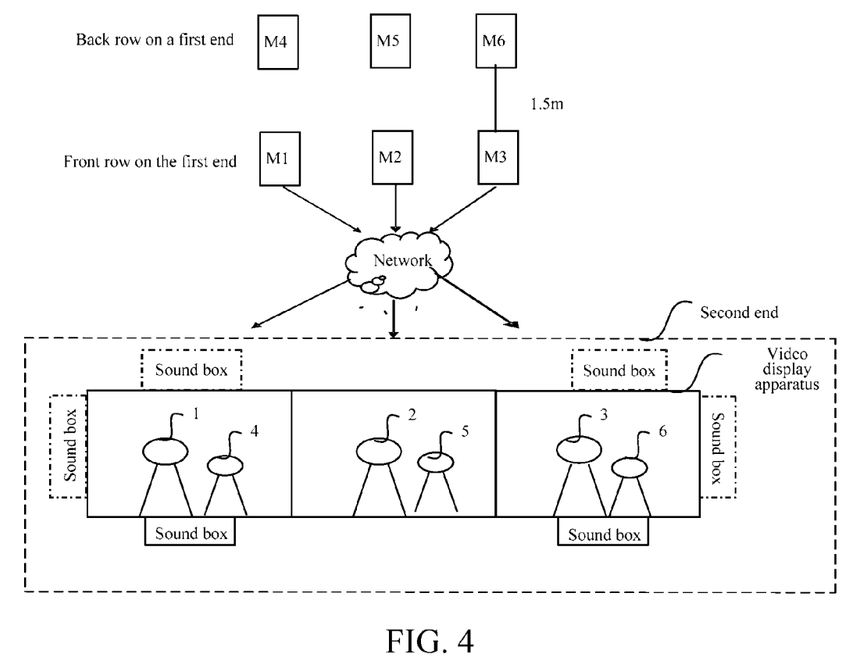
FIG. 4 is a schematic diagram of the embodiment illustrated in FIG. 3.

FIG. 3 is a flowchart of a third embodiment of a method for processing audio in video communication according to the present invention. FIG. 4 is a schematic diagram of the embodiment illustrated in FIG. 3. This embodiment describes a case in which longitudinal-depth processing is performed on audio data on an audio data collection end. As shown in FIG. 3, the method includes:

Step 301: Acquire first audio data that has different audio source position information and audio source position information corresponding to the first audio data in the video communication through different sound pickup devices.

The first audio data is audio data on a local end in the video communication in this embodiment.

The local end in the video communication (that is, the audio data collection end) may pick up the audio data on the local end through a sound pickup device. The sound pickup device may be a microphone, where there may be multiple methods of picking up the audio data through the microphone as long as audio data of participants in different rows is ensured to be identified. For example, each participant on the local end uses one microphone, and audio data picked up by each microphone has corresponding audio source position information, where audio data of participants in the same row corresponds to the same audio source position information; or participants in each row share one or several microphones, and audio data picked up by the microphone in each row corresponds to the same audio source position information. The participants in each row may share one or several microphones according to directivity and sensitivity of the microphone.

After the microphone picks up the first audio data on the local end, preprocessing such as echo cancellation and noise suppression may be performed on the first audio data. An apparatus for processing audio acquires the first audio data that is preprocessed and acquires the audio source position information corresponding to the first audio data according to the microphone corresponding to the first audio data, where microphones in different rows correspond to different audio source position information.

Step 302: Perform the longitudinal-depth processing on the first audio data according to the audio source position information by using an algorithm for controlling a longitudinal-depth feeling.

The longitudinal-depth feeling mainly relates to two factors: loudness of a sound and a acoustic energy ratio between a direct sound and a reverberant sound, and further relates to high-frequency attenuation.

The loudness refers to a volume size. The loudness is inversely proportional to the square of a distance. When the distance doubles, the loudness attenuates by about 6 dB. Therefore, the longer the distance is, the greater the sound attenuation is, and the smaller the volume to human ears is. Accordingly, the sound attenuation may be calculated according to the distance between a front row and a back row, so that the volume of a sound from a front row is different from the volume of a sound from the back row when the sounds are played.

The acoustic energy ratio between the direct sound and the reverberant sound must be adjusted to embody the longitudinal-depth feeling of the sound, where the acoustic energy ratio between the direct sound and the reverberant sound may be adjusted by controlling the delay and the reverberation of the sounds from the front row and the back row. A feeling of spaciousness of the sound may be provided virtually by using the method of increasing the delay and the reverberation. When many direct sounds exist, a listener may feel that the sounds are transmitted from a near place; when many reverberant sounds exist, the feeling of obvious spaciousness is formed, and a listener may feel that the sounds are transmitted from a far place.

In addition, because the wavelength of a high-frequency sound wave is shorter than the wavelength of a low-frequency sound wave, the attenuation of the high-frequency sound wave is higher than the attenuation of the low-frequency sound wave when an obstacle is met in a room. Therefore, the high-frequency attenuation is also a factor that affects the longitudinal-depth feeling.

The algorithm for controlling the longitudinal-depth feeling may be as follows: parameters about room environment such as the room size and the reverberant time in the room is acquired first, a system transmission function is calculated according to the parameters about the room environment, and then the longitudinal-depth feeling effect of a sound may be controlled by controlling the three factors of the system transmission function, which are the loudness, the acoustic energy of the direct sound and the reverberant sound, and the high-frequency attenuation, so that the sound effect matches the audio source position of the sound, for example, the listener may distinguish that the sound is transmitted from a distance of 1 m or transmitted from a distance of 2 m.

The algorithm for controlling the longitudinal-depth feeling may be preconfigured on the apparatus for processing audio, so that the apparatus for processing audio performs, after acquiring the audio data and the audio source position information each time, the longitudinal-depth processing on the audio data according to the audio source position information and the algorithm. For example, when the audio source position information is 1 m, the ratio of the loudness, the delay, and the reverberation, and the high-frequency attenuation may be adjusted by using the algorithm, so that audio data with the longitudinal-depth feeling effect of 1 m is generated; when the audio source position information is 0, it indicates that the audio source is located in the very front row, and therefore it is not necessary to perform the longitudinal-depth processing on the sound generated from this audio source.

Step 303: Send the first audio data that has undergone the longitudinal-depth processing to a peer end in the video communication, so that the peer end plays the first audio data that has undergone the longitudinal-depth processing.

The apparatus for processing audio sends the first audio data that has undergone the longitudinal-depth processing to the peer end in the video communication, that is, a playing end of the first audio data, so that the playing end plays the first audio data that has undergone the longitudinal-depth processing.

It should be noted that when an MCU controls the video communication, the foregoing apparatus for processing audio in this embodiment may perform the longitudinal-depth processing (step 302) on the audio data on the audio data collection end or on the MCU end; when no MCU controls the video communication, the foregoing apparatus for processing audio in this embodiment performs the longitudinal-depth processing on the audio data on the audio data collection end. When the longitudinal-depth processing on the audio data is performed on the MCU end, the collection end sends the audio data and the audio source position information corresponding to the audio data that are acquired in step 301 to the MCU end. After the MCU end performs the longitudinal-depth processing on the audio data, the audio data that has undergone the longitudinal-depth processing is sent to the playing end.

However, when any two channels or multiple channels of audio data collected by the microphone is sent to the peer end through one channel of data stream, the foregoing longitudinal-depth processing on the audio data in this embodiment can only be performed on the audio data collection end, and after the apparatus for processing audio located on the collection end performs the longitudinal-depth processing on the audio data, an audio mixing switching step is further included, that is, the step 303 may be replaced with the following step:

Step 303': The apparatus for processing audio performs audio mixing switching on the audio data that has undergone the longitudinal-depth processing, and then sends one channel or two channels of data that is obtained by performing the switching to the peer end in the video communication.

For example, when a system uses a monaural or binaural code, multiple channels of audio data that has undergone the longitudinal-depth processing is mixed, then one channel or two channels of data signals are obtained by performing the switching according to a preconfigured policy, and the data signals by performing the switching are encoded and sent to the peer end. After receiving, decoding, and obtaining the data signals, the peer end obtains a sound that provides the longitudinal-depth feeling by directly playing the data signals.

Step 304: The peer end decodes and plays the received audio data.

The peer end first decodes the received audio data, and then outputs the decoded audio data through a loudspeaker.

The following describes this embodiment with reference to FIG. 4. As shown in FIG. 4, there are two rows (a front row and a back row) of participants on a first end. A first participant 1 in the front row, a second participant 2 in the front row, and a third participant 3 in the front row use a first microphone M1, a second microphone M2, and a third microphone M3 in the front row to pick up sounds, respectively. No longitudinal-depth feeling processing is performed on the data from the microphones in the front row. A first participant 4 in the back row, a second participant 5 in the back row, and a third participant 6 in the back row use a fourth microphone M4, a fifth microphone M5, and a sixth microphone M6 in the back row to pick up sounds, respectively. The distance between the front row and the back row is 1.5 m. A longitudinal-depth feeling effect of 1.5 m is added uniformly to the data collected by the microphones in the back row. Therefore, when the sounds picked up by the microphones in the front row are transmitted to a second end for playing, a participant on the second end feels that the sounds are generated from the loudspeaker (such as a sound box); when the sounds picked up by the microphones in the back row are transmitted to the second end for playing, a participant on the second end feels that the sounds are generated from the place with a distance of 1.5 m behind the loudspeaker, where, the loudspeakers are placed in a same plane, which may be located above, below, or on the left or the right of a video display apparatus; for the first end, the first end is the local end, and the second end is the peer end; and for the second end, the second end is the local end, and the first end is the peer end.

According to this embodiment of the present invention, the apparatus for processing audio first acquires audio data and the audio source position information corresponding to the audio data in the video communication, then performs the longitudinal-depth processing on the audio data according to the acquired audio source position information to process the audio data to make it be audio data that provides the longitudinal-depth feeling that matches the audio source position information, and then sends the processed audio data to the peer end in the video communication for playing. In this way, a listener on the peer end may be capable of distinguishing the front/back position of a speaker according to a sound in the video communication.

Figure 5:
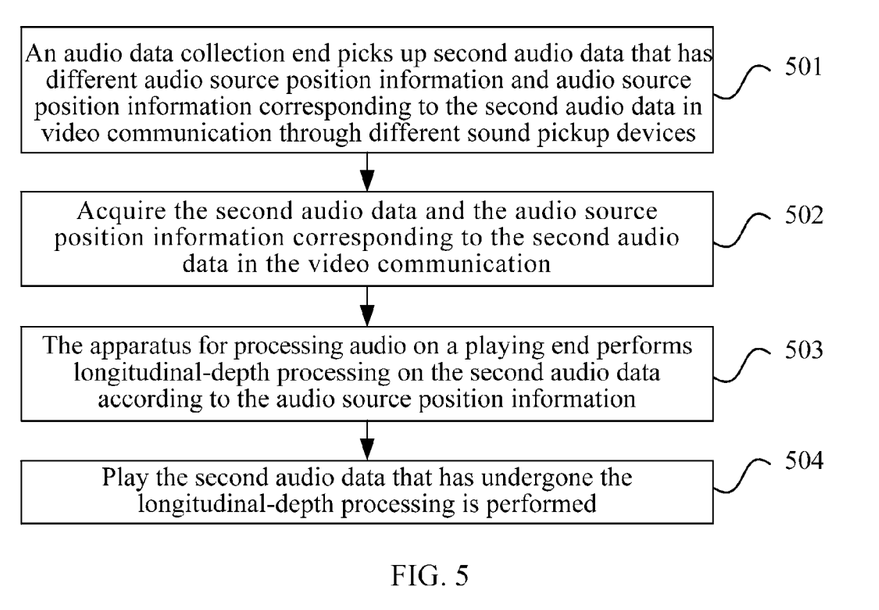
FIG. 5 is a flowchart of a fourth embodiment of a method for processing audio in video communication according to the present invention.

FIG. 5 is a flowchart of a fourth embodiment of a method for processing audio in video communication according to the present invention. This embodiment describes a case in which longitudinal-depth processing is performed on audio data on an audio data playing end. As shown in FIG. 5, the method includes:

Step 501: An audio data collection end picks up second audio data that has different audio source position information and audio source position information corresponding to the second audio data in the video communication through different sound pickup devices, where the second audio data is the audio data on a peer end in the video communication in this embodiment. According to this embodiment, the audio data collection end is the peer end, and an audio data playing end is a local end.

For the process of picking up the audio data by the sound pickup device, reference may be made to the description in step 301 according to the embodiment illustrated in FIG. 3.

After picking up the audio data, the sound pickup device sends the audio data that is picked up to an apparatus for processing audio on the collection end. At the same time, the apparatus for processing audio on the collection end acquires the audio source position information corresponding to the audio data by using an identifier of the sound pickup device. Different sound pickup devices correspond to participants at different front/back positions, so that audio source position information corresponding to audio data picked up by a sound pickup device may be acquired according to the difference of sound pickup devices.

Step 502: Acquire the second audio data and the audio source position information corresponding to the second audio data in the video communication.

The apparatus for processing audio on the collection end encodes and sends the acquired second audio data and audio source position information to an apparatus for processing audio on the playing end, so that the apparatus for processing audio on the playing end acquires the second audio data and the audio source position information by decoding.

Step 503: The apparatus for processing audio on the playing end performs longitudinal-depth processing on the second audio data according to the audio source position information.

Specifically, this step may includes step a or step b.

Step a: The apparatus for processing audio on the playing end performs the longitudinal-depth processing on the second audio data according to the audio source position information by using an algorithm for controlling a longitudinal-depth feeling.

For this step, reference may be specifically made to step 302 according to the embodiment illustrated in FIG. 3.

Step b: The apparatus for processing audio on the playing end performs wave field synthesis processing on the second audio data according to the audio source position information to form the second audio data that has undergone the longitudinal-depth processing.

During the wave field synthesis (Wave Field Synthesis), the Huyghen principle is used to synthesize a sound wave. The wave field synthesis technology is as follows: Every point on a wave front (Wave Front) may be seen as a new wave source, these new wave sources have the same rate and wavelength as the original wave sources, and these new wave sources form a new wave front at the next instant after superposition. Using the wave field synthesis technology may reproduce a sound field realistically.

The wave field synthesis technology may be based on the sound wave theory, and multiple loudspeakers that are placed on a plane are used to form a loudspeaker matrix to generate a wave field, where the wave field is the furthest wave front away from the wave source; each loudspeaker in the matrix is fed with signals that correspond to the position of the loudspeaker and are calculated by using the Rayleigh reconstruction integral; each loudspeaker generates a sound wave according to the signals; the accurate wave field of the original sound wave is reconstructed within a crossover frequency by the superposition of the sound waves generated by each loudspeaker; and the crossover frequency depends on a distance between each loudspeaker. The sound field obtained by using the wave field synthesis technology is reconstructed in the whole listening space and retains the time domain and space features of the original sound field.

The process of performing the wave field synthesis processing on the second audio data by the apparatus for processing audio on the playing end according to the audio source position information may be as follows:

The playing end uses the loudspeaker matrix to play the audio, where multiple (such as 6) loudspeakers may be used, which are placed below a video display apparatus; and the specific number of loudspeakers is determined according to an algorithm and a practical application scenario; the apparatus for processing audio performs, according to the sound source position information of the audio data, different calculations on the audio data and outputs the audio data to the multiple loudspeakers to enable the multiple loudspeakers to play the audio simultaneously; these sounds are superposed; the generated sounds form a wave front; and the position of the original audio source is provided virtually on the wave front, thereby recovering the sound source that provides the longitudinal-depth feeling.

Step 504: Play the second audio data that has undergone the longitudinal-depth processing.

After performing the longitudinal-depth processing on the second audio data by using the algorithm for controlling the longitudinal-depth feeling, the apparatus for processing audio on the playing end plays the processed second audio data, or when the longitudinal-depth processing is performed on the second audio data by using the wave field synthesis technology, the audio that is played by the loudspeaker is the processed second audio data.

According to this embodiment of the present invention, the apparatus for processing audio first acquires the audio data and the audio source position information corresponding to the audio data on the peer end in the video communication, then performs the longitudinal-depth processing on the audio data according to the acquired audio source position information to process the audio data to make it be audio data that provides the longitudinal-depth feeling that matches the audio source position information, and then plays the processed audio data. In this way, a listener on the peer end may be capable of distinguishing the front/back position of a speaker according to a sound in the video communication.

A person skilled in the art should understand that all or a part of the steps of the methods in the embodiments may be implemented by a computer program instructing relevant hardware. The program may be stored in a computer readable storage medium. When the program is run, the steps of the methods in the embodiments are performed. The above storage medium includes various mediums capable of storing program codes, such as a ROM, a RAM, a magnetic disk, or an optical disk.

Figure 6:
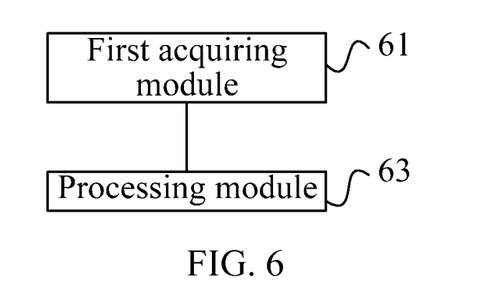
FIG. 6 is a schematic diagram of a first embodiment of an apparatus for processing audio in video communication according to the present invention.

FIG. 6 is a schematic diagram of a first embodiment of an apparatus for processing audio in video communication according to the present invention. As shown in FIG. 6, the apparatus for processing audio includes a first acquiring module 61 and a processing module 63.

The first acquiring module 61 is configured to acquire audio data and audio source position information corresponding to the audio data in the video communication.

The processing module 63 is configured to perform longitudinal-depth processing on the audio data according to the audio source position information acquired by the first acquiring module 61.

The apparatus for processing audio in this embodiment may be a device on an audio data collection end, may be a device on an audio data playing end, or may also be a device on an MCU end in the video communication. For working processes and working principles of each module in this embodiment, refer to the description in the first method embodiment. Details are not repeated herein.

According to this embodiment of the present invention, the first acquiring module first acquires the audio data and the audio source position information corresponding to the audio data in the video communication, and then performs, according to the acquired audio source position information, the longitudinal-depth processing on the audio data to make it be audio data that provides a longitudinal-depth feeling that matches the audio source position information, so that sounds generated by objects at different front/back positions can be distinguished in the video communication.

Figure 7:
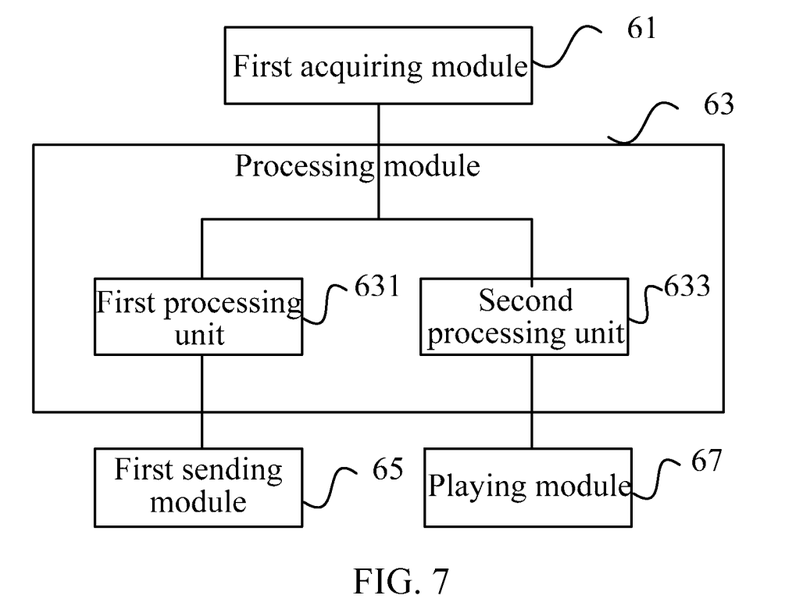
FIG. 7 is a schematic diagram of a second embodiment of an apparatus for processing audio in video communication according to the present invention.

FIG. 7 is a schematic diagram of a second embodiment of an apparatus for processing audio in video communication according to the present invention. Based on the embodiment illustrated in FIG. 6 and as shown in FIG. 7, the processing module 63 may specifically include a first processing unit 631 and/or a second processing unit 633. Further, the apparatus for processing audio may include a first sending module 65 and a playing module 67.

The first processing unit 631 is configured to perform, according to the audio source position information acquired by the first acquiring module, the longitudinal-depth processing on first audio data by using an algorithm for controlling a longitudinal-depth feeling when the audio data is the first audio data on a local end or a transmit end in the video communication, where when the apparatus for processing audio is located on the MCU end, two parties in the video communication may be called a transmit end and a receive end according to the direction of a data stream.

The second processing unit 633 is configured to perform the longitudinal-depth processing on second audio data according to the audio source position information by using the algorithm for controlling the longitudinal-depth feeling when the audio data is the second audio data on a peer end in the video communication; or the second processing unit 633 is configured to perform, according to the audio source position information, wave field synthesis processing on the second audio data to form the second audio data that has undergone the longitudinal-depth processing when the audio data is the second audio data on the peer end in the video communication.

The first sending module 65 is configured to send the first audio data that has undergone the longitudinal-depth processing by the first processing unit 631 to the peer end in the video communication, so that the peer end plays the first audio data that has undergone the longitudinal-depth processing.

When the apparatus for processing audio is located on an audio data playing end, that is, when the longitudinal-depth processing is performed on the audio data playing end, the apparatus for processing audio further includes a playing module 67 that is configured to play the second audio data that has undergone the longitudinal-depth processing by the second processing unit 633.

Specifically:

When the apparatus for processing audio is located on an audio data playing end, that is, when the longitudinal-depth processing is performed on the audio data playing end, the first acquiring module 61 may be specifically configured to acquire the audio data that has different audio source position information and the audio source position information corresponding to the audio data in the video communication through different sound pickup devices.

When the apparatus for processing audio is located on the MCU end, that is, when the longitudinal-depth processing is performed on the MCU end, the first acquiring module 61 may be specifically configured to receive the audio data and the audio source position information corresponding to the audio data that are sent by the audio data collection end.

When the apparatus for processing audio is located on the audio data playing end, that is, when the longitudinal-depth processing is performed on the audio data playing end, the first acquiring module 61 may be specifically configured to receive the audio data and the audio source position information corresponding to the audio data that are sent by the audio data collection end.

For working processes and working principles of each module in this embodiment, refer to the description in each of the preceding method embodiments. Details are not repeated herein.

According to this embodiment of the present invention, the apparatus for processing audio first acquires the audio data and the audio source position information corresponding to the audio data in the video communication, then performs the longitudinal-depth processing on the audio data according to the acquired audio source position information to process the audio data to make it be audio data that provides the longitudinal-depth feeling that matches the audio source position information, and then sends the processed audio data to the peer end in the video communication for playing. In this way, a listener on the peer end may be capable of distinguishing the front/back position of a speaker according to a sound in the video communication.

Figure 8:
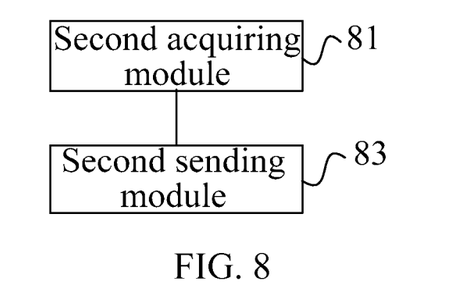
FIG. 8 is a schematic diagram of a third embodiment of an apparatus for processing audio in video communication according to the present invention.

FIG. 8 is a schematic diagram of a third embodiment of an apparatus for processing audio in video communication according to the present invention. As shown in FIG. 8, the apparatus for processing audio includes a second acquiring module 81 and a second sending module 83.

The apparatus for processing audio provided in this embodiment may apply to the following scenario: In the video communication, longitudinal-depth processing is performed on audio data on an audio data playing end or on an MCU end in the video communication. The apparatus for processing audio provided in this embodiment is arranged on an audio data collection end.

The second acquiring module 81 is configured to acquire audio data and audio source position information corresponding to the audio data on a local end in the video communication.

The second sending module 83 is configured to send the audio data and the audio source position information that are acquired by the second acquiring module 81 to a video communication control unit or a peer end in the video communication, so that the video communication control unit or the peer end in the video communication performs the longitudinal-depth processing on the audio data according to the audio source position information.

For working processes and working principles of each module in this embodiment, refer to the description in the second method embodiment. Details are not repeated herein.

According to this embodiment of the present invention, the apparatus for processing audio acquires the audio data and the audio source position information corresponding to the audio data on the local end in the video communication, and then sends out the acquired audio data and audio source position information, so that the MCU or the peer end in the video communication performs the longitudinal-depth processing on the audio data according to the audio source position information to obtain the audio data that provides a longitudinal-depth feeling that matches the audio source position information. In this way, a listener may be capable of distinguishing sounds generated by objects at different front/back positions in the video communication.

Finally, it should be noted that the above embodiments of the present invention are merely intended for describing the technical solutions of the present invention other than limiting the present invention. Although the present invention is described in detail with reference to the foregoing embodiments, a person skilled in the art should understand that modifications to the technical solution described in the foregoing embodiments or make equivalent substitutions to some technical features thereof can still be made, and such modifications and equivalent substitutions cannot make the essence of relevant technical solutions depart from the spirit and scope of the technical solution of the embodiments of the present invention.

What is claimed is:

1. A method for processing audio in video communication, comprising:
  acquiring audio data and audio source position information corresponding to the audio data in a video communication, wherein the video communication includes audio from participants arranged in two or more rows of participants in the video communication, wherein the two or more rows of participants include at least a front row and at least one row behind the front row, and wherein the audio source position information specifies that the audio data is acquired from the at least one row behind the front row; and
  performing longitudinal-depth processing on the audio data according to the audio source position information, wherein, for each row included in the at least one row behind the front row, audio data from each participant in the row corresponds to the same audio source position information.

2. The method for processing audio in video communication according to claim 1, wherein the audio source position information is information about a position of a participant corresponding to the audio data relative to the front row in the video communication.

3. The method for processing audio in video communication according to claim 1, wherein the audio data is first audio data acquired on a local end in the video communication, and the performing longitudinal-depth processing on the audio data according to the audio source position information comprises:
  performing the longitudinal-depth processing on the first audio data according to the audio source position information by using an algorithm for controlling a longitudinal-depth feeling.

4. The method for processing audio in video communication according to claim 3, wherein after the performing longitudinal-depth processing on the audio data according to the audio source position information, the method further comprising:
  sending the first audio data that has undergone the longitudinal-depth processing to a peer end in the video communication, so that the peer end plays the first audio data that has undergone the longitudinal-depth processing.

5. The method for processing audio in video communication according to claim 1, wherein the audio data is acquired through one or more sound pickup devices.

6. The method for processing audio in video communication according to claim 1, wherein performing the longitudinal-depth processing on the audio data comprises:
  adjusting loudness of a sound of the audio data,
  determining an acoustic energy ratio between a direct sound and a reverberant sound of the sound, and
  performing a high-frequency attenuation of the sound.

7. The method for processing audio in video communication according to claim 1, wherein the audio data is acquired on a peer end in the video communication, and the performing longitudinal-depth processing on the audio data according to the audio source position information comprises:
  performing, at the peer end, the longitudinal-depth processing on the audio data according to the audio source position information.

8. The method for processing audio in video communication according to claim 1, wherein the audio data is acquired on a peer end in the video communication, and the performing longitudinal-depth processing on the audio data according to the audio source position information comprises:
  performing, according to the audio source position information, wave field synthesis processing on the audio data to form audio data that has undergone the longitudinal-depth processing.

9. The method for processing audio in video communication according to claim 7, wherein after the performing longitudinal-depth processing on the audio data according to the audio source position information, the method further comprising:
  playing the audio data that has undergone the longitudinal-depth processing.

10. A method for processing audio in video communication, comprising:
  acquiring audio data and audio source position information corresponding to the audio data on a local end in a video communication, wherein the video communication includes audio from participants arranged in two or more rows of participants in the video communication, wherein the two or more rows of participants include at least a front row and at least one row behind the front row, and wherein the audio source position information specifies that the audio data is acquired from the at least one row behind the front row; and sending the audio data and the audio source position information to a video communication control unit or to a peer end in the video communication, so that the video communication control unit or the peer end in the video communication performs longitudinal-depth processing on the audio data according to the audio source position information, wherein, for each row included in the at least one row behind the front row, audio data from each participant in the row corresponds to the same audio source position information.

11. An apparatus for processing audio in video communication, comprising:

a first acquiring module, configured to acquire first audio data and first audio source position information corresponding to the first audio data in a video communication, wherein the video communication includes audio from participants arranged in two or more rows of participants in the video communication, wherein the two or more rows of participants include at least a front row and at least one row behind the front row, and wherein the audio source position information specifies that the audio data is acquired from the at least one row behind the front row; and a processing module, configured to perform longitudinal-depth processing on the first audio data according to the first audio source position information acquired by the first acquiring module, wherein, for each row included in the at least one row behind the front row, audio data from each participant in the row corresponds to the same audio source position information.

12. The apparatus for processing audio in video communication according to claim 11, wherein the first audio data is acquired on a local end in the video communication.

13. The apparatus for processing audio in video communication according to claim 12, wherein the processing module is further configured to perform longitudinal-depth processing on second audio data according to second audio source position information corresponding to the second audio data, wherein the second audio data is acquired on a peer end in the video communication.

14. The apparatus for processing audio in video communication according to claim 12, wherein the processing module is further configured to perform, according to second audio source position information corresponding to second audio, wave field synthesis processing on the second audio data to form the second audio data that has undergone the longitudinal-depth processing, wherein the second audio data is acquired on a peer end in the video communication.

15. The apparatus for processing audio in video communication according to claim 12, further comprising:

a first sending module, configured to send the first audio data that has undergone the longitudinal-depth processing performed by the processing unit to a peer end in the video communication, so that the peer end plays the first audio data that has undergone the longitudinal-depth processing.

16. The apparatus for processing audio in video communication according to claim 13, further comprising:

a playing module, configured to play the second audio data that has undergone the longitudinal-depth processing performed by the processing unit.

17. The apparatus for processing audio in video communication according to claim 14, further comprising:

a playing module, configured to play the second audio data that has undergone the longitudinal-depth processing performed by the processing unit.

18. An apparatus for processing audio in video communication, comprising:

an acquiring module, configured to acquire audio data and audio source position information corresponding to the audio data on a local end in a video communication, wherein the video communication includes audio from participants arranged in two or more rows of participants in the video communication, wherein the two or more rows of participants include at least a front row and at least one row behind the front row, and wherein the audio source position information specifies that the audio data is acquired from the at least one row behind the front row; and a sending module, configured to send the audio data and the audio source position information that are acquired by the acquiring module to a video communication control unit or to a peer end in the video communication, so that the video communication control unit or the peer end in the video communication performs longitudinal-depth processing on the audio data according to the audio source position information, wherein, for each row included in the at least one row behind the front row, audio data from each participant in the row corresponds to the same audio source position information.

19. The method for processing audio in video communication according to claim 1, wherein performing the longitudinal-depth processing on the audio data comprises:

acquiring a room size and a reverberant time in a room of the video communication; and calculating a system transmission function according to the room size and the reverberant time, wherein the longitudinal-depth processing is based on the system transmission function.

20. The apparatus for processing audio in video communication according to claim 18, wherein performing the longitudinal-depth processing on the audio data comprises:

acquiring a room size and a reverberant time in a room of the video communication; and calculating a system transmission function according to the room size and the reverberant time, wherein the longitudinal-depth processing is based on the system transmission function.

* * * * *